(12) United States Patent
Nakano et al.

(10) Patent No.: US 8,583,882 B2
(45) Date of Patent: Nov. 12, 2013

(54) STORAGE SUBSYSTEM AND ITS CONTROL METHOD

(75) Inventors: Takahiro Nakano, Yokohama (JP); Jun Nemoto, Yokohama (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 493 days.

(21) Appl. No.: 12/863,664

(22) PCT Filed: Jul. 5, 2010

(86) PCT No.: PCT/JP2010/004393
§ 371 (c)(1),
(2), (4) Date: Jul. 20, 2010

(87) PCT Pub. No.: WO2012/004827
PCT Pub. Date: Jan. 12, 2012

(65) Prior Publication Data
US 2012/0005440 A1    Jan. 5, 2012

(51) Int. Cl.
*G06F 12/02* (2006.01)
(52) U.S. Cl.
USPC ............................. 711/161; 711/117
(58) Field of Classification Search
USPC ................................. 711/117, 161
See application file for complete search history.

(56) References Cited

U.S. PATENT DOCUMENTS

| 2006/0230086 | A1 | 10/2006 | Devarakonda et al. |
| 2008/0177810 | A1 | 7/2008 | Devarakonda et al. |
| 2010/0095164 | A1 | 4/2010 | Kamei et al. |
| 2010/0274826 | A1* | 10/2010 | Takata et al. ................. 707/812 |
| 2011/0252214 | A1* | 10/2011 | Naganuma et al. ............ 711/170 |

FOREIGN PATENT DOCUMENTS

| EP | 2178005 A2 | 4/2010 |
| JP | 2010-97359 | 4/2010 |
| WO | 2006107340 A2 | 10/2006 |

* cited by examiner

*Primary Examiner* — Jared Rutz
(74) *Attorney, Agent, or Firm* — Brundidge & Stanger, P.C.

(57) ABSTRACT

A new storage tier is added to a plurality of storage tiers configured in storage areas of a plurality of types of storage devices, whose processing performance is different from each other, without changing its operation form.

If a new Tier3 constituting a file system FS4 is added between Tier2 and Tier3, a file server 16 adds a registered generation 1 to a tier number change management table 78, sets Tier3 as the added file system FS4 in the registered generation 1, manages Tier4 as a file system FS5, which has been changed from the former Tier3, adds a policy corresponding to a policy number 1005 to a migration policy management table76, updates only the registered generation from 0 to 1 for policy numbers 1002, 1005, and manages the migration policy management table.

12 Claims, 16 Drawing Sheets

| REGISTERED GENERATION | CHANGE TABLE | |
|---|---|---|
| | TIER WHEN REGISTERED | ID |
| 0 | 1 | FS1 |
| | 2 | FS3 |
| | 3 | FS5 |
| 1 | 1 | FS1 |
| | 2 | FS3 |
| | 3 | FS4 |
| | 4 | FS5 |

FIG.5

| SHARED NAME (100) | AUTHORIZATION CONDITION (102) | SHARED POINT (104) |
|---|---|---|
| Developer (120) | BELONG TO DEVELOPMENT GROUP | /share/developer |
| Sales (122) | BELONG TO SALES GROUP | /share/sales |

| MOUNT POINT (200) | FILE SYSTEM (202) | DEVICE (204) |
|---|---|---|
| / (220) | STANDARD FILE SYSTEM (SUCH AS EXT3) | /dev/sda |
| /share (222) | TIER STORAGE FILE SYSTEM | /dev/disk0 |
| /mnt/disk1 (224) | STANDARD FILE SYSTEM | /dev/disk1 |
| /mnt/disk2 (226) | STANDARD FILE SYSTEM | /dev/disk2 |
| /mnt/disk3 (228) | STANDARD FILE SYSTEM | /dev/disk3 |

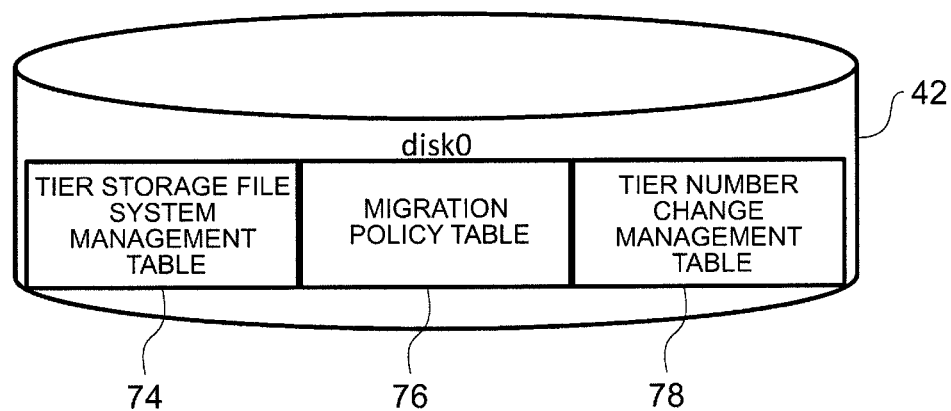

FIG. 8

| Tier | SERVER | PARAMETER | CONNECTION METHOD | ACCOUNT | ID |
|---|---|---|---|---|---|
| 1 | localhost | /mnt/disk1 | DIRECT |  | FS1 |
| 2 | localhost | /mnt/disk3 | DIRECT |  | FS3 |
| 3 | server2 | /archive | FTP | user:passwd | FS5 |

FIG. 9

| POLICY NUMBER | MIGRATION SOURCE TIER | MIGRATION DESTINATION TIER | REGISTERED GENERATION | ACTIVATION SCHEDULE | CONDITION |
|---|---|---|---|---|---|
| 1001 | 1 | 2 | 0 | EVERY DAY AT 0:00 | 7 DAYS HAVE ELAPSED SINCE LAST ACCESS |
| 1002 | 2 | 3 | 0 | EVERY SATURDAY AT 0:00 | 30 DAYS HAVE ELAPSED SINCE LAST ACCESS |
| 1003 | 1 | 3 | 0 | EVERY DAY AT 0:00 | WRITE PROHIBITED SETTING |
| 1004 | *(OTHER THAN TIER 1) | Tier-1 | 0 | EVERY DAY AT 0:00 | ACCESSED WITHIN THE PAST ONE DAY |

FIG. 10

| REGISTERED GENERATION | CHANGE TABLE | |
|---|---|---|
|  | TIER WHEN REGISTERED | ID |
| 0 | 1 | FS1 |
|  | 2 | FS3 |
|  | 3 | FS5 |

| | Tier | SERVER | PARAMETER | CONNECTION METHOD | ACCOUNT | ID |
|---|---|---|---|---|---|---|
| 320 | 1 | localhost | /mnt/disk1 | DIRECT | | FS1 |
| 322 | 2 | localhost | /mnt/disk3 | DIRECT | | FS3 |
| 324 | 4 | server2 | /archive | FTP | user:passwd | FS5 |
| 326 | 3 | server1 | /bigstore | HTTP | user:passwd | FS4 |

Table 78:

| REGISTERED GENERATION | CHANGE TABLE | |
|---|---|---|
| | TIER WHEN REGISTERED | ID |
| 0 (520) | 1 | FS1 |
| | 2 | FS3 |
| | 3 | FS5 |
| 1 (522) | 1 | FS1 |
| | 2 | FS3 |
| | 3 | FS4 |
| | 4 | FS5 |

Labels: 500, 502, 504, 506

FIG.19

Table 76:

| POLICY NUMBER | MIGRATION SOURCE TIER | MIGRATION DESTINATION TIER | REGISTERED GENERATION | ACTIVATION SCHEDULE | CONDITION |
|---|---|---|---|---|---|
| 1001 | 1 | 2 | 0 | EVERY DAY AT 0:00 | 7 DAYS HAVE ELAPSED SINCE LAST ACCESS |
| 1002 | 2 | 3 | 0 | EVERY SATURDAY AT 0:00 | 30 DAYS HAVE ELAPSED SINCE LAST ACCESS |
| 1003 | 1 | 3 | 0 | EVERY DAY AT 0:00 | WRITE PROHIBITED SETTING |
| 1004 | * (OTHER THAN TIER 1) | Tier-1 | 0 | EVERY DAY AT 0:00 | ACCESSED WITHIN THE PAST ONE DAY |

Labels: 400, 402, 404, 406, 408, 410, 420, 422, 424, 426

| POLICY NUMBER | MIGRATION SOURCE TIER | MIGRATION DESTINATION TIER | ACTIVATION SCHEDULE | CONDITION |
|---|---|---|---|---|
| 1001 | 1 | 2 | EVERY DAY AT 0:00 | 7 DAYS HAVE ELAPSED SINCE LAST ACCESS |
| 1002 | 2 | 4 | EVERY SATURDAY AT 0:00 | 30 DAYS HAVE ELAPSED SINCE LAST ACCESS |
| 1003 | 1 | 4 | EVERY DAY AT 0:00 | WRITE PROHIBITED SETTING |
| 1004 | *(OTHER THAN TIER 1) | Tier-1 | EVERY DAY AT 0:00 | ACCESSED WITHIN THE PAST ONE DAY |

POLICY LIST SCREEN

OPERATIONAL OBJECT: /share(/dev/disk0)

| POLICY NUMBER | MIGRATION SOURCE TIER | MIGRATION DESTINATION TIER | ACTIVATION SCHEDULE | CONDITION |
|---|---|---|---|---|
| 1001 | 1 | 2 | EVERY DAY AT 0:00 | 7 DAYS HAVE ELAPSED SINCE LAST ACCESS |
| 1002 | 2 | 3 | EVERY SATURDAY AT 0:00 | 30 DAYS HAVE ELAPSED SINCE LAST ACCESS |
| 1003 | 1 | 3 | EVERY DAY AT 0:00 | WRITE PROHIBITED SETTING |
| 1004 | *(OTHER THAN TIER 1) | Tier-1 | EVERY DAY AT 0:00 | ACCESSED WITHIN THE PAST ONE DAY |

[ NEW ] [ CHANGE ] [ DELETE ] [ CANCEL ]

FIG.22

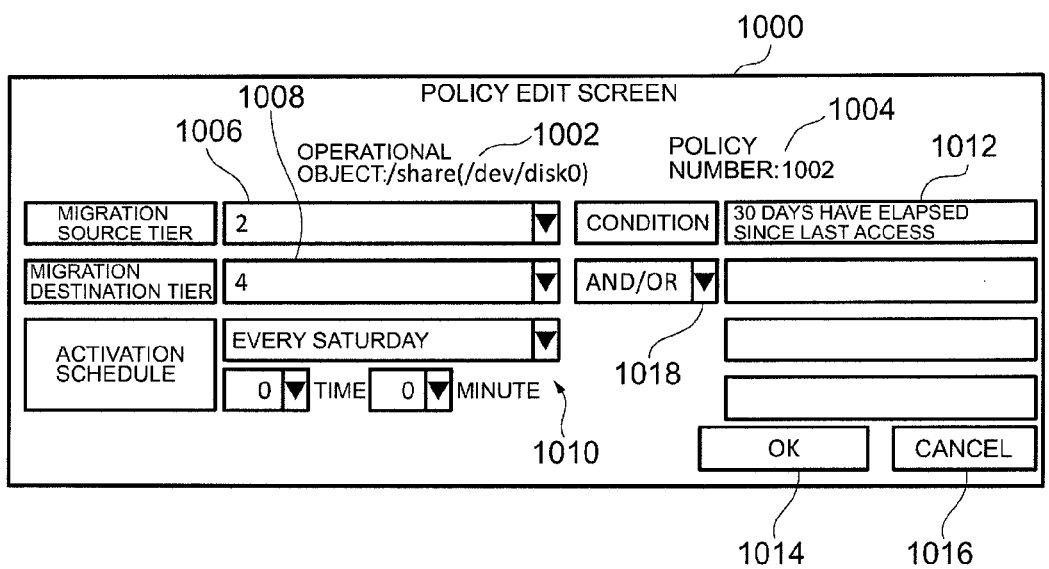

FIG.23

| | POLICY NUMBER | MIGRATION SOURCE TIER | MIGRATION DESTINATION TIER | REGISTERED GENERATION | ACTIVATION SCHEDULE | CONDITION |
|---|---|---|---|---|---|---|
| 420 | 1001 | 1 | 2 | 0 | EVERY DAY AT 0:00 | 7 DAYS HAVE ELAPSED SINCE LAST ACCESS |
| 422 | 1002 | 2 | 3 | 1 | EVERY SATURDAY AT 0:00 | 30 DAYS HAVE ELAPSED SINCE LAST ACCESS |
| 424 | 1003 | 1 | 3 | 0 | EVERY DAY AT 0:00 | WRITE PROHIBITED SETTING |
| 426 | 1004 | * (OTHER THAN TIER 1) | Tier-1 | 0 | EVERY DAY AT 0:00 | ACCESSED WITHIN THE PAST ONE DAY |
| 428 | 1005 | 3 | 4 | 1 | THIRD SUNDAY EVERY MONTH AT 0:00 | 1 YEAR HAS ELAPSED SINCE LAST ACCESS |

FIG.24

| POLICY NUMBER | MIGRATION SOURCE TIER | MIGRATION DESTINATION TIER | ACTIVATION SCHEDULE | CONDITION |
|---|---|---|---|---|
| 1001 | 1 | 2 | EVERY DAY AT 0:00 | 7 DAYS HAVE ELAPSED SINCE LAST ACCESS |
| 1002 | 2 | 3 | EVERY SATURDAY AT 0:00 | 30 DAYS HAVE ELAPSED SINCE LAST ACCESS |
| 1003 | 1 | 4 | EVERY DAY AT 0:00 | WRITE PROHIBITED SETTING |
| 1004 | *(OTHER THAN TIER 1) | Tier-1 | EVERY DAY AT 0:00 | ACCESSED WITHIN THE PAST ONE DAY |
| 1005 | 3 | 4 | THIRD SUNDAY EVERY MONTH AT 0:00 | 1 YEAR HAS ELAPSED SINCE LAST ACCESS |

FIG.25

| Tier | SERVER | PARAMETER | CONNECTION METHOD | ACCOUNT | ID |
|---|---|---|---|---|---|
| 1 | localhost | /mnt/disk1 | DIRECT | | FS1 |
| 3 | localhost | /mnt/disk2 | DIRECT | | FS3 |
| 5 | server2 | /archive | FTP | user:passwd | FS5 |
| 4 | server1 | /bigstore | HTTP | user:passwd | FS4 |
| 2 | localhost | /dev/disk2 | DIRECT | | FS2 |

FIG.26

| REGISTERED GENERATION | CHANGE TABLE | |
| --- | --- | --- |
| | TIER WHEN REGISTERED | ID |
| 0 | 1 | FS1 |
| | 2 | FS3 |
| | 3 | FS5 |
| 1 | 1 | FS1 |
| | 2 | FS3 |
| | 3 | FS4 |
| | 4 | FS5 |
| 2 | 1 | FS1 |
| | 2 | FS2 |
| | 3 | FS3 |
| | 4 | FS4 |
| | 5 | FS5 |

FIG.27

| POLICY NUMBER | MIGRATION SOURCE TIER | MIGRATION DESTINATION TIER | REGISTERED GENERATION | ACTIVATION SCHEDULE | CONDITION |
| --- | --- | --- | --- | --- | --- |
| 1001 | 1 | 2 | 0 | EVERY DAY AT 0:00 | 7 DAYS HAVE ELAPSED SINCE LAST ACCESS |
| 1002 | 2 | 3 | 1 | EVERY SATURDAY AT 0:00 | 30 DAYS HAVE ELAPSED SINCE LAST ACCESS |
| 1003 | 1 | 3 | 0 | EVERY DAY AT 0:00 | WRITE PROHIBITED SETTING |
| 1004 | *(OTHER THAN TIER 1) | Tier-1 | 0 | EVERY DAY AT 0:00 | ACCESSED WITHIN THE PAST ONE DAY |
| 1005 | 3 | 4 | 1 | THIRD SUNDAY EVERY MONTH AT 0:00 | 1 YEAR HAS ELAPSED SINCE LAST ACCESS |

| POLICY NUMBER | MIGRATION SOURCE TIER | MIGRATION DESTINATION TIER | ACTIVATION SCHEDULE | CONDITION |
|---|---|---|---|---|
| 1001 | 1 | 3 | EVERY DAY AT 0:00 | 7 DAYS HAVE ELAPSED SINCE LAST ACCESS |
| 1002 | 3 | 4 | EVERY SATURDAY AT 0:00 | 30 DAYS HAVE ELAPSED SINCE LAST ACCESS |
| 1003 | 1 | 5 | EVERY DAY AT 0:00 | WRITE PROHIBITED SETTING |
| 1004 | *(OTHER THAN TIER 1) | Tier-1 | EVERY DAY AT 0:00 | ACCESSED WITHIN THE PAST ONE DAY |
| 1005 | 4 | 5 | THIRD SUNDAY EVERY MONTH AT 0:00 | 1 YEAR HAS ELAPSED SINCE LAST ACCESS |

| POLICY NUMBER | MIGRATION SOURCE TIER | MIGRATION DESTINATION TIER | REGISTERED GENERATION | ACTIVATION SCHEDULE | CONDITION |
|---|---|---|---|---|---|
| 1001 | 2 | 3 | 2 | EVERY DAY AT 0:00 | 7 DAYS HAVE ELAPSED SINCE LAST ACCESS |
| 1002 | 2 | 3 | 1 | EVERY SATURDAY AT 0:00 | 30 DAYS HAVE ELAPSED SINCE LAST ACCESS |
| 1003 | 1 | 3 | 0 | EVERY DAY AT 0:00 | WRITE PROHIBITED SETTING |
| 1004 | *(OTHER THAN TIER 1) | Tier-1 | 0 | EVERY DAY AT 0:00 | ACCESSED WITHIN THE PAST ONE DAY |
| 1005 | 3 | 4 | 1 | THIRD SUNDAY EVERY MONTH AT 0:00 | 1 YEAR HAS ELAPSED SINCE LAST ACCESS |
| 1006 | 1 | 2 | 2 | EVERY DAY AT 0:00 | 1 DAY HAS ELAPSED SINCE LAST ACCESS |

| POLICY NUMBER | MIGRATION SOURCE TIER | MIGRATION DESTINATION TIER | ACTIVATION SCHEDULE | CONDITION |
|---|---|---|---|---|
| 1001 | 2 | 3 | EVERY DAY AT 0:00 | 7 DAYS HAVE ELAPSED SINCE LAST ACCESS |
| 1002 | 3 | 4 | EVERY SATURDAY AT 0:00 | 30 DAYS HAVE ELAPSED SINCE LAST ACCESS |
| 1003 | 1 | 5 | EVERY DAY AT 0:00 | WRITE PROHIBITED SETTING |
| 1004 | * (OTHER THAN TIER 1) | Tier-1 | EVERY DAY AT 0:00 | ACCESSED WITHIN THE PAST ONE DAY |
| 1005 | 4 | 5 | THIRD SUNDAY EVERY MONTH AT 0:00 | 1 YEAR HAS ELAPSED SINCE LAST ACCESS |
| 1006 | 1 | 2 | EVERY DAY AT 0:00 | 1 DAY HAS ELAPSED SINCE LAST ACCESS |

STORAGE SUBSYSTEM AND ITS CONTROL METHOD

TECHNICAL FIELD

The present invention relates to a storage subsystem for managing a storage apparatus having a plurality of types of storage devices, whose processing performance is different from each other, and also relates to a method for controlling such a storage subsystem.

BACKGROUND ART

Storage devices such as FC (Fibre) disks, SATA (Serial Advanced Technology Attachment) disks, SAS (Serial Attached SCSI) disks, SSDs (Solid State Drives), and optical disks are used in a storage system. When these storage devices are used, the resulting performance of volumes constituting the storage system will be different depending on which type of storage devices is used.

For example, if SSDs are used as storage devices, they can constitute volumes that are expensive and exhibit high response performance. On the other hand, if SATA disks are used as storage devices, they can constitute inexpensive volumes although they exhibit lower response performance than the volumes constituted from SSDs; and it is possible to secure a larger capacity at the same cost as that of the SSDs.

Also, data stored in the volumes have a tendency to be used frequently by users immediately after they are stored in the volumes; but they will be used less frequently as time passes. If data not used remain to be stored in high-performance volumes, this will result in wasteful consumption of the high-performance volumes.

Therefore, a data management method called a Hierarchical Storage Management (HSM) function as described in, for example, Japanese Patent Application Laid-Open (Kokai) Publication No. 2010-97359 is suggested. This HSM function is implemented by, for example, a storage system having a plurality of volumes with different performance, where a file shared server creates a file system in each volume. In this circumstance, the file shared server migrates a file from a high-performance volume to a low-performance volume according to file usage frequency.

Specifically speaking, a plurality of storage tiers (Tiers) are configured according to the performance of storage devices; and a frequently used file(s) is retained in Tier1 constituted from high-speed, expensive volumes, and a file(s) which is not used so often is retained in Tier2 constituted from low-speed, inexpensive volumes. If a policy is set under the circumstances described above to migrate a file belonging to Tier1 to Tier2 after the elapse of a certain period of time since last access, a file belonging to Tier1 is migrated to Tier2 according to the description of this policy. In this case, data can be migrated in files, which are small units. Therefore, it is easy to migrate a file between the storage tiers and it is possible to change the storage location of a file depending on the performance, cost, and characteristics of the storage devices. Furthermore, if a lower-level storage tier (Tier3) having non-rewritable media called WORM (Write Once Read Many) is configured, it is possible to achieve a balance between the performance and cost and guarantee no falsification of data.

CITATION LIST

Patent Literature

PTL 1: Japanese Patent Application Laid-Open (Kokai) Publication No. 2010-97359

SUMMARY OF INVENTION

Technical Problem

If storage devices constituting a storage tier are newly added to a storage system by means of the conventional HSM function, a new storage tier is formed with the newly added storage devices, and the new storage tier needs to be inserted between existing storage tiers, the new storage tier cannot be inserted between the existing storage tiers unless there is a vacant storage tier number. Even if there is a vacant storage tier number, the operation of the system needs to be stopped.

For example, if Tiers 1, 2, 3 exist as storage tiers and a new file system is to be added between Tier2 and Tier3, it is necessary to migrate the entire data of the former Tier3 to another tier while suspending the operation of the storage system, delete the data of the former Tier3, change the former Tier3 to a new Tier4, set a storage tier constituted from newly added storage devices to be a new Tier3, and reconstruct the new Tier3 as a new file system.

The present invention was devised in light of the above-described problems of the conventional art and it is an object of the invention to provide: a storage subsystem capable of adding a new storage tier to a plurality of storage tiers configured in storage areas of a plurality of types of storage devices, whose processing performance is different from each other, without changing its operation form; and a method for controlling such a storage subsystem.

Solution to Problem

In order to achieve the above-described object, the invention is characterized in that a tier storage file system configured by integrating a plurality of file systems including a file group configured in storage areas of a plurality of types of storage devices, whose processing performance is different from each other, and virtually hierarchizing the integrated file systems into a plurality of storage tiers is managed as an access object for an access requester, and the relationship between each file system and a tier level of a storage tier, to which each file system belongs, is managed by using a tier number change management table by associating it with a registered generation based on the time of registration; and a plurality of pieces of policy information that set a migration condition for each file system is managed as information including the relationship between a migration destination storage tier of each file system and the registered generation by using a migration policy management table; and if a storage tier constituted from a new file system is to be added as a new storage tier to the plurality of storage tiers, a new registered generation is added to the tier number change management table and the tier number change management table is updated by adding the new storage tier to the storage tiers in the new registered generation; and new policy information is added to the migration policy management table and the migration policy management table is updated by setting a registered generation, in which a migration destination storage tier of the file system becomes the new storage tier, as the new registered generation.

Advantageous Effects of Invention

According to the present invention, it is possible to add a new storage tier to a plurality of storage tiers configured in storage areas of a plurality of types of storage devices, whose processing performance is different from each other, without changing its operation form.

BRIEF DESCRIPTION OF DRAWINGS

FIG. 5 is a configuration diagram of an export table.
FIG. 6 is a configuration diagram of a mount table.
FIG. 7 is a configuration diagram of a management disk.
FIG. 8 is a configuration diagram of a tier storage file system management table.
FIG. 9 is a configuration diagram of a migration policy management table.
FIG. 10 is a configuration diagram of a tier number change management table.
FIG. 18 is a configuration diagram of the tier number change management table after adding Tier3.
FIG. 19 is a configuration diagram of the migration policy management table immediately after adding Tier3.
FIG. 20 is a configuration diagram of the migration policy list table immediately after adding Tier3.
FIG. 21 is a display example of a policy list screen.
FIG. 22 is a display example of a policy edit screen.
FIG. 23 is a configuration diagram of the migration policy management table after adding Tier3 and a policy.
FIG. 24 is a configuration diagram of a migration policy list table after adding Tier3 and a policy.
FIG. 25 is a configuration diagram of the tier storage file system management table after adding Tier2.
FIG. 26 is a configuration diagram of the tier number change management table after adding Tier2.
FIG. 27 is a configuration diagram of the migration policy management table immediately after adding Tier2.
FIG. 28 is a configuration diagram of the migration policy list table immediately after adding Tier2.
FIG. 29 is a configuration diagram of the migration policy management table after adding Tier2 and a policy.
FIG. 30 is a configuration diagram of the migration policy list table after adding Tier2 and a policy.

DESCRIPTION OF EMBODIMENTS

This embodiment is configured so that when managing a storage apparatus having a plurality of types of storage devices whose processing performance is different from each other, a tier storage file system configured by integrating a plurality of file systems including a file group configured in a storage area of each storage device and virtually hierarchizing the integrated file systems into a plurality of storage tiers is managed as an access object for an access requester; the relationship between each file system and a tier level of a storage tier, to which each file system belongs, is managed by using a tier number change management table by associating it with a registered generation based on the time of registration; and a plurality of pieces of policy information that set a migration condition for each file system is managed as information including the relationship between a migration destination storage tier of each file system and the registered generation by using a migration policy management table.

An embodiment of this invention will be explained with reference to the attached drawing.

Figure 1:
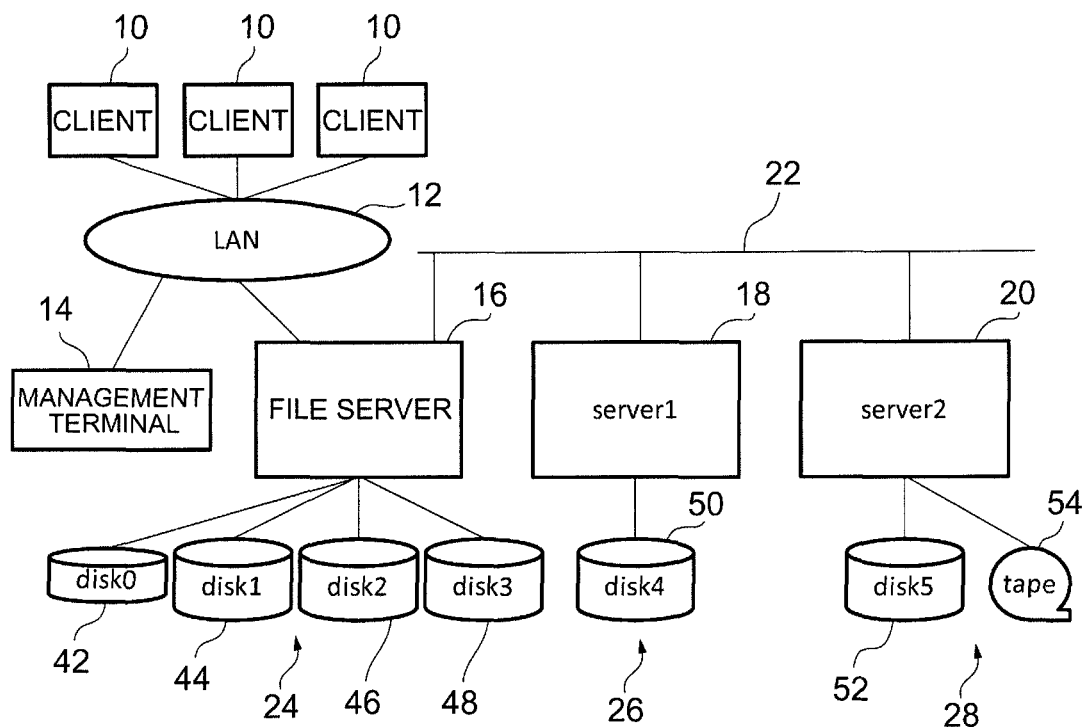
FIG. 1 is a block configuration diagram of a computer system to which this invention is applied.

FIG. 1 is a system configuration diagram of a computer system to which this invention is applied. Referring to FIG. 1, the computer system includes a plurality of client terminals (hereinafter referred to as the clients) 10, a network 12, a management terminal 14, a file server (hereinafter sometimes referred to as localhost) 16, a first server (server1) 18, a second server (server2) 20, a network 22, and storage apparatuses 24, 26, 28. The file server 16, the first server 18, the second server 20, and the storage apparatuses 24 to 28 are configured as a storage subsystem. Incidentally, the networks 12, 22 are composed of, for example, LANs (Local Area Networks).

Each client 10 includes a CPU (Central Processing Unit), input-output devices, a memory, and a network interface (all of which are not shown in the drawing), and the network interface is connected to the network 12. The CPU for each client 10 executes processing according to programs stored in the memory and issues an access request to the file server 16. For example, each client 10 issues a read request or write request to the file server 16 by means of the processing by the CPU by designating a shared name of a file and a path name.

The management terminal 14 includes a CPU, input-output devices, a memory, and a network interface (all of which are not shown in the drawing) in order to manage the storage subsystem and the communication network is connected to the network 12. The CPU executes processing according to programs stored in the memory and operations by an administrator and sends the processing result to the file server 16. For example, if the administrator operates to give setting change or operational instructions to the file server 16, the CPU executes processing according to these instructions.

Figure 2:
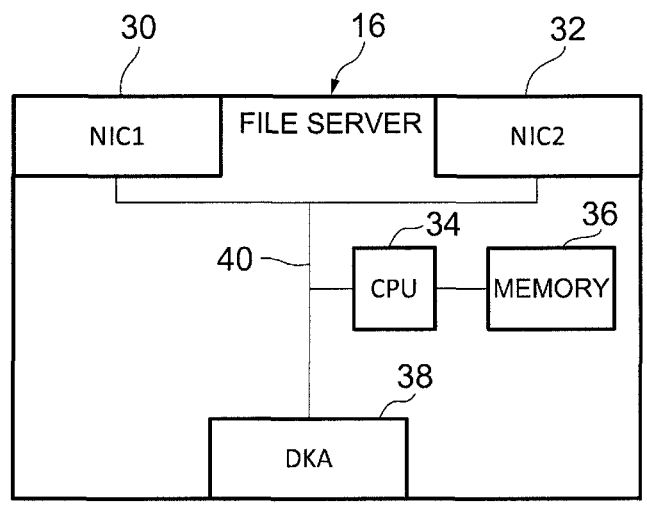
FIG. 2 is an internal configuration diagram of a file server.

The file server 16 includes a first network interface card (NIC1) 30, a second network interface card (NIC2) 32, a CPU 34, a memory 36, a disk adapter (DKA) 38, and an internal network 40 as shown in FIG. 2.

The first network interface card 30 is connected to the network 12 and the internal network 40 and sends information to, or receives information from, each client 10 or the management terminal 14 via the network 12. The second network interface card 32 is connected to the network 22 and the internal network 40 and sends information to, or receives information from, the first server 18 or the second server 20. The disk adapter 38 is connected to the storage apparatus 24 and sends data to, or receives data from, the storage apparatus 24.

The CPU 34 is connected to the internal network 40 and the memory 36 and executes various processing according to programs stored in the memory 36. For example, the CPU 34 executes processing for sending information to, or receiving information from, each client 10 or the management terminal 14, controls data input-output processing on the storage apparatus 24, and controls file input-output processing on file systems configured by the storage apparatus 24.

The storage apparatus 24 includes: a disk (disk0) 42 for storing management information; a disk (disk1) 44 constituted from high-speed storage devices to form a first file system (FS1); a disk 46 constituted from medium-speed storage devices to form a second file system (FS2); and a disk 48 constituted from low-speed storage devices to form a third file system (FS3). The storage apparatus 26 is constituted from a disk 50 to form a fourth file system (FS4). The storage apparatus 28 includes a disk 5 to form a fifth file system (FS5), and a tape device 54.

Incidentally, each of the first server 18 and the second server 20 can be constituted from the same components as those of the file server 16. In this circumstance, the second network interface card 32 is connected to the network 22 and the disk adapter 38 is connected to the storage apparatus 26 or the storage apparatus 28.

Figure 3:
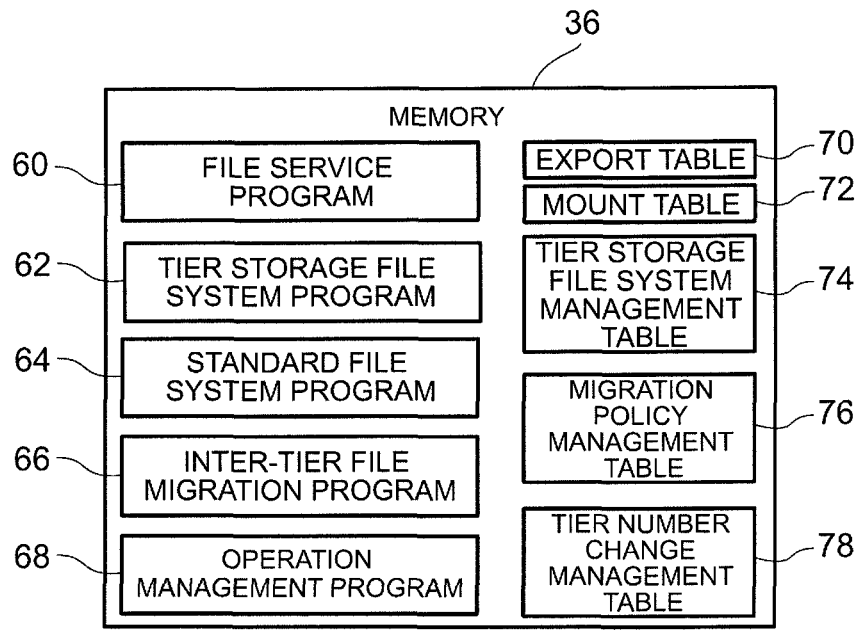
FIG. 3 is a configuration diagram of a memory.

Next, FIG. 3 shows the configuration of the memory 36. Referring to FIG. 3, the memory 36 stores a file service program 60, a tier storage file system program 62, a standard file system program 64, an inter-tier file migration program 66, and an operation management program 68, as well as an export table 70, a mount table 72, a tier storage file system management table 74, a migration policy management table 76, and a tier number change management table 78.

The file service program 60 communicates with each client 10 according to communication protocol (such as NFS/CIFS/FTP/HTTP), provides each client 10 with information about file sharing, and accepts a read/write request from each client 10. When accepting an access request from each client 10, the file service program 60 executes processing for referring to the export table 70 based on a shared name added to that access request, adding a shared point before a path name added to the access request, and turning processing over to a file system described in the mount table 72, for example, a standard file system or a tier storage file system.

The tier storage file system program 62 is a program for managing a virtual file system shared by the clients 10.

Figure 4:
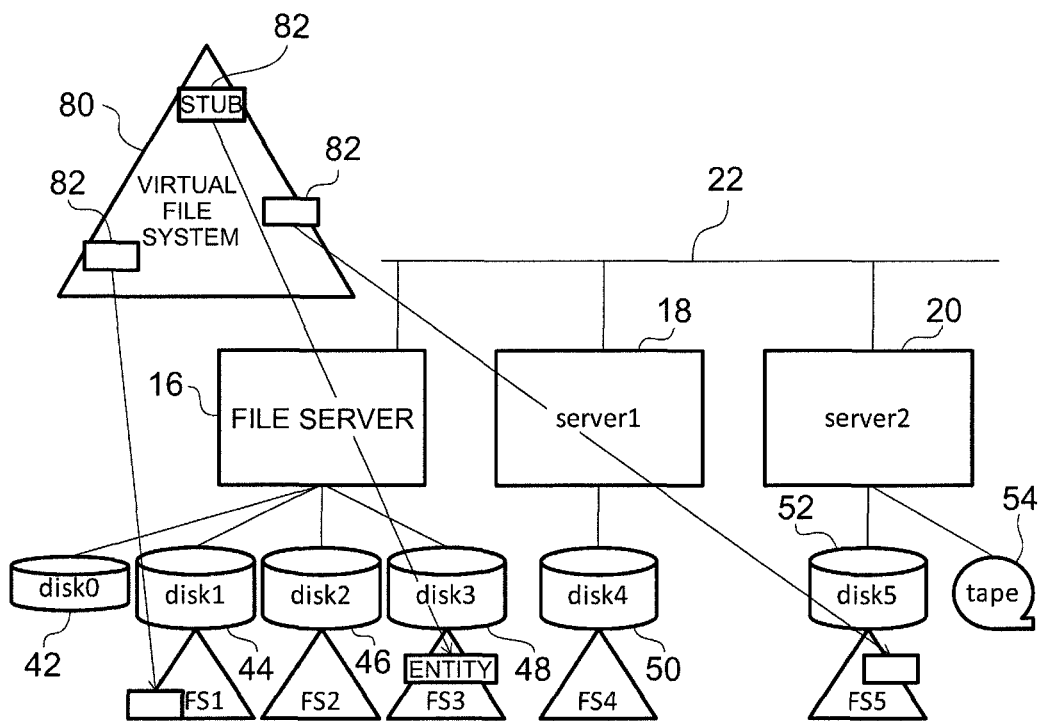
FIG. 4 is a diagrammatic illustration explaining the concept of a tier storage file system.

For example, as shown in FIG. 4, the virtual file system (which will be sometimes referred to as the tier storage file system) 80 is composed of a tier directory which is a file name space and is configured by setting file systems including file groups constituted from each volume constructed in each storage area of the disks 44, 46, 48, 50, 52 to be the first file system FS1 to the fifth file system FS5, integrating these file systems, dividing them into a plurality of storage tiers (Tiers), and virtually hierarchizing them.

In response to a file access from each client 10, the virtual file system 80 refers to the stub information 82, judges to which storage tier the designated file belongs, and turns the access to a file entity over to the standard file system program 64 according to the judgment result.

Specifically speaking, the stub information 82 is set to the virtual file system 80 and the file server 16 monitors the stub information 82 in the virtual file system 80 and executes processing for migrating the file entity as necessary. When this happens, the file server 16 stores information indicating the storage location of the file entity in the stub information 82 and also stores access time. When read/write processing is executed on a file, the file server 16 updates the last access time of the stub information 82.

When creating a new file and writing data to the new file, the file server 16 stores a file entity (data) in a storage tier (Tier1) constituted from high-speed storage devices, from among the storage tiers, records file creation time in the stub information 82, and updates the access time.

In this way, file names and file entities are managed separately according to this embodiment; and a file can be accessed as one file system from each client 10 and the file entities are divided and stored in high-performance storage devices and low-cost storage devices according to the access status. Accordingly, conflicting demands, that is, high performance and cost reduction can be satisfied by storing high-frequency access files in the high-speed storage device and low-frequency access files in the low-cost storage devices.

The standard file system program 64 is a program for managing the position of the file entity positions. This standard file system program 64 is activated during the process of the processing by the file service program 60 or the tier storage file system program 62 and executes data input-output processing on the files according to file storage location information (information indicating the locations to store the file entities).

Specifically speaking, the CPU 34 for the file server 16 serves as a controller for recognizing each client 10 as the access requester and managing the virtual file system 80 as an object to be accessed by each client 10, refers to the stub information 82 in response to an access request from the access requester, extracts a file system of a storage tier, in which the file designated by the access request exists, from among a plurality of file systems FS1 to FS5, extracts the file designated by the access request from a file group belonging to the extracted file system, and executes the data input-output processing (read processing or write processing) on the extracted file.

The inter-tier file migration program 66 is a program for migrating a file between storage tiers according to a policy and updates the stub information 82 for the virtual file system 80 according to the processing result. This inter-tier file migration program 66 is activated based on a description of the migration policy management table 76 during the course of the operation management program 68 when reference is made to the migration policy management table 76. When the inter-tier file migration program 66 is activated, it searches a migration source tier file system for a file that meets the relevant condition, extracts the file, migrates the file entity of the extracted file to a migration destination tier file system, and changes information about the name space of the virtual file system 80 (information about the tier directory).

The operation management program 68 provides an administrator who operates the management terminal 14, with an operation management interface for the file server 16 and executes processing for changing the settings of the file server 16 and operating the file server 16 in accordance with instructions from the administrator. For example, the operation management program 68 executes processing for, for example, activating the inter-tier file migration program 66 according to the migration policy management table 76, adding a storage tier to the virtual file system 80, and changing the policy (changing the policy number).

Next, FIG. 5 shows the configuration of the export table 70. The export table 70 includes a shared name field 100, an authorization condition field 102, and a shared point field 104.

The shared name is information provided to each client 10 as information shared by the clients 10. For example, the shared name field 100 stores Developer for an entry 120 and Sales for an entry 122.

The authorization condition is information for authorizing, for example, a person belonging to a specified group to access the relevant file. The authorization condition field 102 stores Belong To Development Group for the entry 120 and Belong To Sales Group for the entry 122.

The shared point is information about the tier directory (name space) constructed in the file server 16. The shared point field 104 stores /share/developer for the entry 120 and /share/sales for the entry 122.

Next, FIG. 6 shows the example of the mount table 72. The mount table 72 includes a mount point field 200, a file system field 202, and a device field 204.

The mount point is information about a mount point of the tier directory. The mount point field 200 stores / for an entry 220, /share for an entry 222, /mnt/disk1 for an entry 224, /mnt/disk2 for an entry 226, and /mnt/disk3 for an entry 228.

The file system is information about programs activated by the file server 16. This file system field 202 stores the Standard File System (such as ext3) for the entry 220, the Tier Storage File System for the entry 222, and the Standard File System for the entries 224 to 228.

The device is information about a device which is an object of processing executed by the standard file system program 64 or the tier storage file system program 62. This device field 204 stores /dev/sda for the entry 220, /dev/disk0 for the entry 222, /dev/disk1 for the entry 224, /dev/disk2 for the entry 226, and /dev/disk3 for the entry 228.

Next, FIG. 7 shows the configuration of the disk 42. The disk 42 stores information about the tier storage file system management table 74, the migration policy management table 76, and the tier number change management table 78. These pieces of information are transferred to the memory 36 at the same time as activation of the file server 16.

Next, FIG. 8 shows the configuration of the tier storage file system management table 74. The tier storage file system management table 74 includes a tier field 300, a server field 302, a parameter field 304, a connection method field 306, an account field 308, and an ID (IDentifier) field 310.

The tier is information for identifying a storage tier to which the file system FS1 to FS5 belongs. The tier field 300 stores 1 corresponding to Tier1 for an entry 320, 2 corresponding to Tier2 for an entry 322, and 3 corresponding to Tier3 for an entry 324.

The server is information about the name of a server for managing each storage tier (Tier). The server field 302 stores localhost as the name of the file server 16 for the entry 320, localhost as the name of the file server 16 for the entry 322, and server 2 as the name of the second server 20 for the entry 324.

The parameter is information about the mount point of the tier directory. The parameter field 304 stores /mnt/disk1 corresponding to the mount point of the disk 44 for the entry 320, /mnt/disk3 corresponding to the mount point of the disk 48 for the entry 322, and /archive for corresponding to the mount point of the disk 52 for the entry 324.

The connection method is information about the connection method used by each server. This connection method field 306 stores Direct for each entry 320, 322 and FTP (File Transfer Protocol) for the entry 324.

The account is information for identifying a user of the server. For example, the account field 308 stores user: passwd for the entry 324.

The ID is information about an identifier for uniquely identifying a file system belonging to each storage tier (Tier). This ID field 310 stores FS1 corresponding to the file system FS1 composed of the disk 44 for the entry 320, FS3 corresponding to the file system FS3 composed of the disk 48 for the entry 322, and FS5 corresponding to the file system SF5 composed of the disk 52 for the entry 324.

Next, FIG. 9 shows the configuration of the migration policy management table 76. The migration policy management table 76 stores a policy number field 400, a migration source tier field 402, a migration destination tier field 404, a registered generation field 406, an activation schedule field 408, and a condition field 410.

The policy number is a number assigned so that the administrator can easily recognize the relevant policy. If four policies (policy information) are set corresponding to the policy numbers 1001 to 1004, the policy number field 400 stores 1001, 1002, 1003, and 1004 for entries 420, 422, 424, 426, respectively.

The migration source tier is information for identifying a migration source storage tier (Tier) to which a migration object file belongs. For example, if a file corresponding to the policy number 1001 belongs to Tier1, the migration source tier field 402 for the entry 420 stores 1. If a file corresponding to the policy number 1002 belongs to Tier2, the migration source tier field 402 for the entry 422 stores 2. If a file corresponding to the policy number 1003 belongs to Tier1, the migration source tier field 402 for the entry 424 stores 1. If a file corresponding to the policy number 1004 belongs to a storage tier other than Tier1, the migration source tier field 402 for the entry 426 stores the number other than that of Tier1.

The migration destination tier is information for identifying the number of a storage tier (Tier) which is a migration destination of a migration object file. For example, if the migration destination of the file corresponding to the policy number 1001 is Tier2, the migration destination tier field 404 for the entry 420 stores 2. If the migration destination of the file corresponding to the policy number 1002 is Tier3, the migration destination tier field 404 for the entry 422 stores 3. If the migration destination of the file corresponding to the policy number 1003 is Tier3, the migration destination tier field 404 for the entry 424 stores 3. If the migration destination of the file corresponding to the policy number 1004 is other than Tier1, the migration destination tier field 404 for the entry 426 stores Tier1.

The registered generation is information for identifying a registered generation when a migration policy is registered. The registered generation at the initial state is 0 and the registered generation field 406 stores 0 for each entry 420 to 426. Incidentally, if the registered generation at the initial state is set to 0, every time a migration policy is added and registered, the registered generation changes to 1, 2, 3, and so on.

The activation schedule is information about a schedule for activating the relevant migration policy. For example, if the migration policy is executed every day at 0:00, the activation schedule 408 stores Every Day at 0:00 as in the entries 420, 424, 426. If the migration policy is activated every Saturday at 0:00, the activation schedule 408 stores Every Saturday at 0:00 as in the entry 422.

The condition is information about a condition for executing the relevant migration policy. For example, if a condition is set to migrate the file corresponding to the policy number 1001 from Tier1 to Tier 2 when 7 Days Have Elapsed Since Last Access, the condition field 410 for the entry 420 stores 7 Days Have Elapsed Since Last Access. If a condition is set to migrate the file corresponding to the policy number 1002 from Tier2 to Tier3 when 30 Days Have Elapsed Since Last Access, the condition field 410 for the entry 422 stores 30 Days Have Elapsed Since Last Access. If a condition is set to migrate the file corresponding to the policy number 1003 from Tier1 to Tier 3 when Write Prohibited Setting is set, the condition field 410 for the entry 424 stores Write Prohibited Setting. If a condition is set to migrate the file corresponding to the policy number 1004 from a tier other than Tier1 to Tier-1 when the file is Accessed Within the Past One Day, the condition field 410 for the entry 426 stores Accessed Within the Past One Day.

Next, FIG. 10 shows the configuration of the tier number change management table 78. The tier number change management table 78 includes a registered generation field 500 and a change table field 502; and the change table field 502 includes a tier-when-registered field 504 and an ID field 506.

The registered generation is information about a registered generation when a storage tier (Tier) is registered. This registered generation field 500 for an entry 520 stores, for example, 0 as information about the registered generation at the initial state of registration. Every time the registered generation is changed, an entry is added to this registered generation field 500 and the number such as 1, 2, and so on is added sequentially to the added entry.

The tier-when-registered is information indicating the number assigned when each storage tier (Tier) is registered. For example, if Tier1 to Tier3 are registered as three storage tiers, the tier-when-registered field 504 for the entry 520 stores 1, 2, 3 corresponding to Tier1 to Tier3.

The ID is information indicating an identifier for identifying a file system belonging to each storage tier (Tier). For example, if Tier1 is composed of the file system FS1, the ID field 506 for the entry 520 stores FS1 corresponding to Tier1. If Tier2 is composed of the file system FS3, the ID field 506 for the entry 520 stores FS3 corresponding to Tier2. If Tier3 is composed of the file system FS5, the ID field 506 for the entry 520 stores FS5 corresponding to Tier3.

Figure 11:
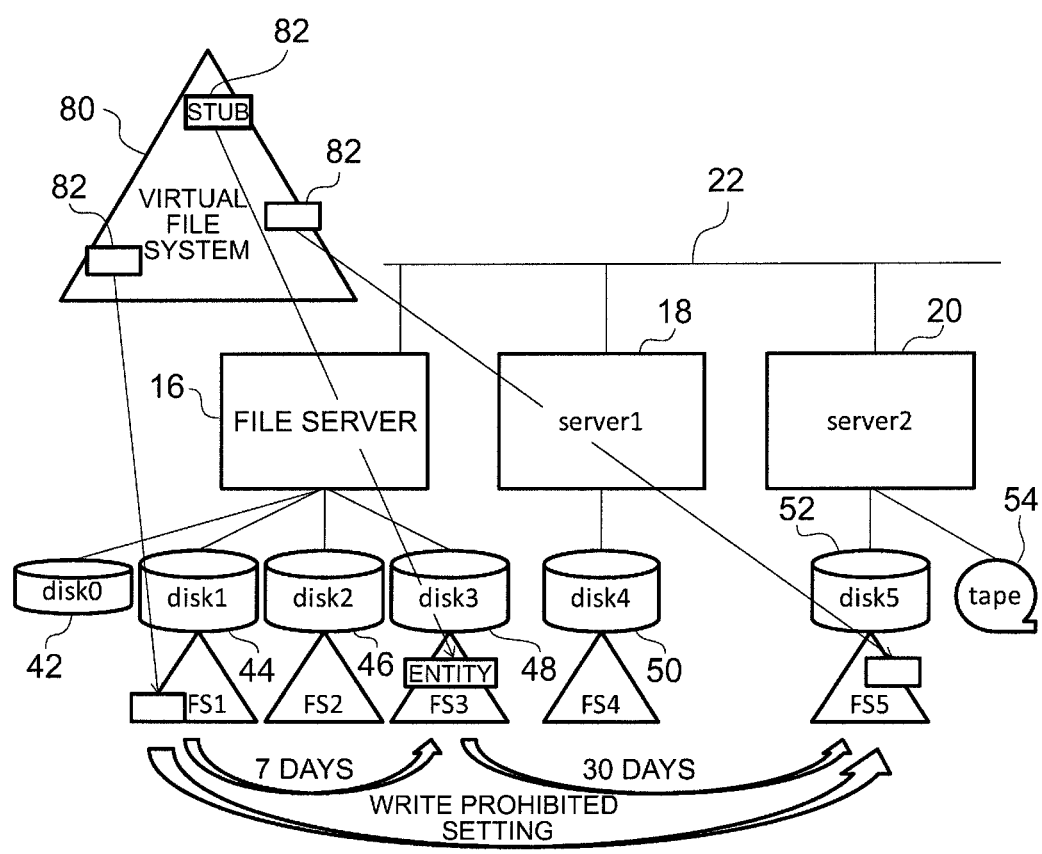
FIG. 11 is a diagrammatic illustration explaining the outline of processing by a tier storage file system in the initial state.

In the initial state where a tier storage file system is constituted from three storage tiers (Tied to Tier3) and four migration policies (policy information) are set, the information of the migration policy management table 76 shown in FIG. 9 is used and the file server 16 executes processing according to the migration policies, using the virtual file system 80 as shown in FIG. 11.

Specifically speaking, if the policy number 1001 is selected from the migration policy management table 76, the file server 16 migrates a file(s), regarding which 7 days have elapsed since last access and which belongs to Tier1, to the file system in Tier2. If the policy number 1002 is selected and a file(s) regarding which 30 days have elapsed since last access exists, the file server 16 migrates such file(s) belonging to Tier2 to the file system in Tier3.

If the policy number 1003 is selected, the file server 16 migrates a file(s) belonging to Tier1, from among files for which the write prohibited setting is set, to the file system in Tier3.

If the policy number 1004 is selected, the file server 16 migrates a file(s) being accessed to a tier of one tier level higher. Specifically speaking, since the access frequency of a file being accessed may possible increase, it is migrated to a higher-level storage tier. For example, a file belonging to Tier3 is migrated to Tier2, or a file belonging to Tier2 is migrated to Tier1.

Figure 12:
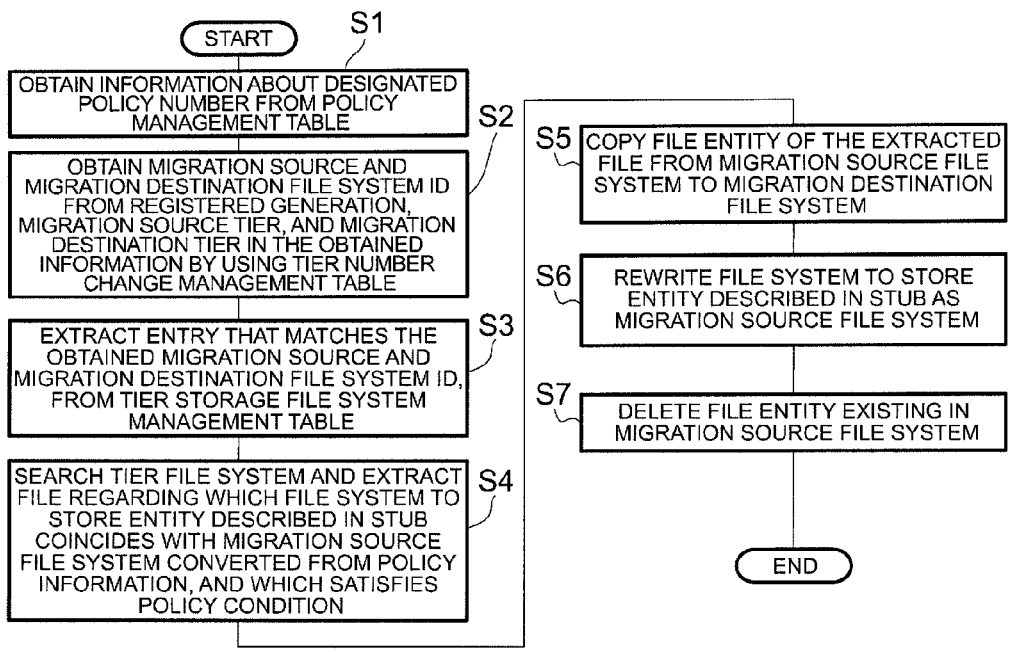
FIG. 12 is a flowchart illustrating processing executed by an inter-tier file migration program.

Next, processing executed by the inter-tier file migration program 66 will be explained with reference to the flowchart in FIG. 12. This processing is executed by the CPU 34 for the file server 16 activating the inter-tier file migration program 66.

Firstly, the CPU 34 refers to the migration policy management table 76 and obtains information about the designated policy number, for example, information about the policy number 1001 from the migration policy management table 76 (S1).

Next, the CPU 34 refers to the tier number change management table 78, using, as a key, the registered generation 0 information in the migration policy management table 76; and obtains the IDs of the migration source file system and the migration destination file system from the registered generation, the migration source tier, and the migration destination tier in the information obtained in step S1, using the tier number change management table 78 (S2). For example, if the information about the policy number 1001 is obtained, the CPU 34 obtains FS1 as the ID corresponding to Tier1, which is the migration source tier, and FS3 as the ID corresponding to Tier2 which is the migration destination tier.

The CPU 34 then refers to the tier storage file system management table 74 and extracts entries that match the migration source file system ID and the migration destination file system ID obtained in step S2 from the tier storage file system management table 74 (S3). For example, if the ID is FS1, the CPU 34 extracts the information in the entry 320; and if the ID is FS3, the CPU 34 extracts the information in the entry 322.

Subsequently, the CPU 34 searches the tier file system, that is, information about the virtual file system 80 constituting the tier file system, and extracts a file regarding which a file system storing the entity (file entity) described in the stub information 82 of the virtual file system 80 coincides with the migration source file system converted from the policy information, and which satisfies the condition of the policy information (S4). For example, if the file system storing the file entity which is described in the stub information 82 is FS1 and the migration source file system converted from the policy number is FS1, the CPU 34 extracts a file that satisfies the condition for the policy number 1001, from among files belonging to the file system FS1.

Next, the CPU 34 copies the file entity of the file extracted in step S4 from the migration source file system to the migration destination file system (S5).

The CPU 34 then rewrites the file system storing the entity (file entity) described in the stub information 82 of the virtual file system 80 as the migration destination file system (S6).

Subsequently, the CPU 34 deletes the file entity existing in the migration source file system (S7) and then terminates the processing in this routine.

Figure 13:
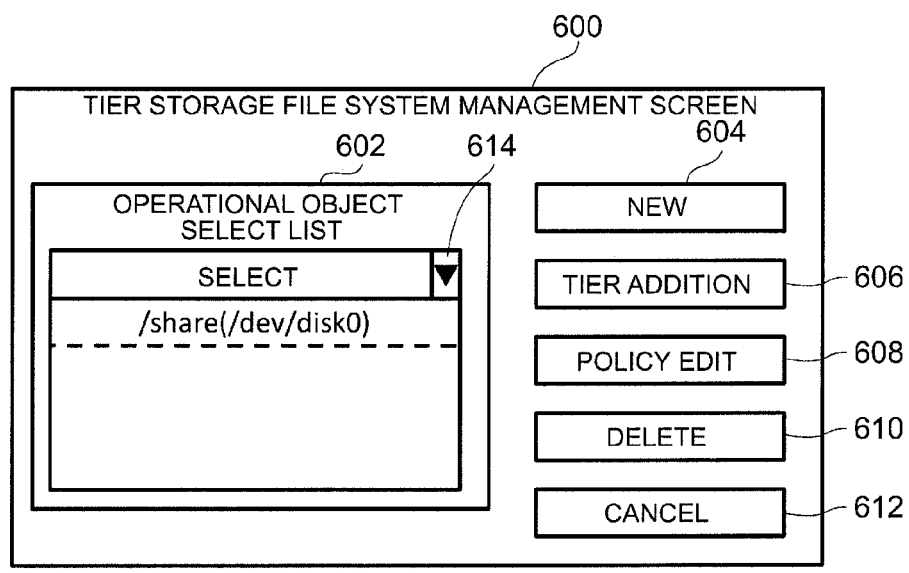
FIG. 13 is a display example of a tier storage file system management screen.

Next, FIG. 13 shows a display example of a tier storage file system management screen 600. The tier storage file system management screen 600 includes an operational object select list display area 602, a new button 604, a tier addition button 606, a policy edit button 608, a delete button 610, and a cancel button 612.

As a pull-down menu button 614 is operated, the operational object select list display area 602 displays a tier storage file system volume that is an object of processing for tier addition, policy edit, and deletion.

If the new button 604 is then selected, it is possible to define a file system which is different from the file systems FS1, FS2, FS3 constituted from the disks 44, 46, 48, using the disk 50 or the disk 52 connected to the first server 18 or the second server 20. For example, if the new button 604 is selected and the disk 42 (disk0) is designated when no file is defined, it is possible to create a storage tier file system having an empty tier storage file system management table 74, an empty migration policy management table 76, and an empty tier number change management table 78.

If the tier addition button 606 is selected, a tier addition screen is displayed as another screen; and if the policy edit button 608 is selected, a policy list screen is displayed as another screen.

Figure 14:
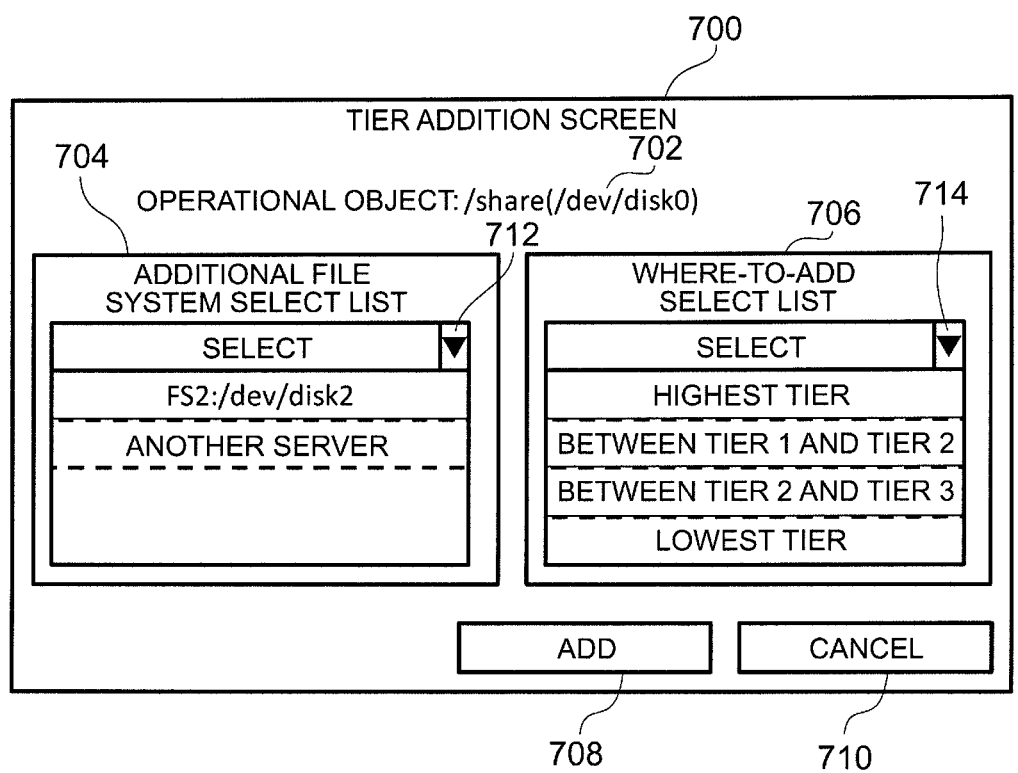
FIG. 14 is a display example of a tier addition screen.

Next, FIG. 14 shows a display example of a tier addition screen 700. The tier addition screen 700 includes an operational object display area 702, an additional file system select list display area 704, a where-to-add select list display area 706, an add button 708, and a cancel button 710.

The operational object display area 702 displays a tier storage file system volume selected as an operational object. As a pull-down menu button 712 is operated, the additional file system select display area 704 displays a file system list under the control of the file server 16 or a file system list under the control of another server such as the first server 18 or the second server 20.

As a pull-down menu button 714 is operated, the where-to-add select list display area 706 displays a list including Highest Tier, Between Tier1 and Tier2, Between Tier2 and Tier3, Lowest Tier. When a file system list to be added is designated by using the pull-down menu button 712 and where to add is selected by using the pull-down menu button 714 and then the add button 708 is operated, tier addition processing by the operation management program 68 is executed.

Figure 15:
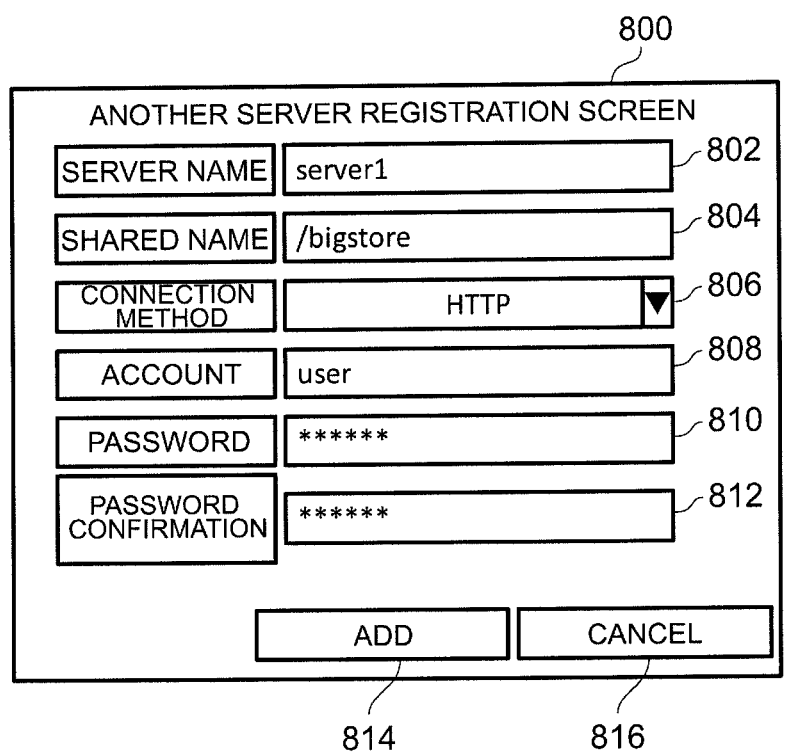
FIG. 15 is a display example of another server registration screen.

If another server list is designated as the file system list to be added, another server registration screen 800 is displayed instead of the tier addition screen 700 as shown in FIG. 15.

Another server registration screen 800 includes a server name display area 802, a shared name display area 804, a connection method display area 806, an account display area 808, a password insertion area 810, a password confirmation area 812, an add button 814, and a cancel button 816.

The server name display area 802 displays, for example, server1 which is a server name of the first server 18, as a name of another server. The shared name display area 804 displays /bigstore as a shared name of the first server 18. The connection method display area 806 displays HTTP as a connection method. The account display area 808 displays user as an account.

As a password is inserted into each of the password insertion area 810 and the password confirmation area 812 and the add button 814 is operated, the tier storage file system management table 74 is updated according to information about the added file system.

On the other hand, if a file system under the control of the file server 16 is selected by using the pull-down menu button 712 when the tier addition screen 700 in is displayed, the server name display area 802 displays localhost as the server name of the file server 16, the shared name display area 804 displays the selected device name, the connection method display area 806 displays Direct, and the account display area 808 is left blank. Subsequently, after the password is inserted into each of the password insertion area 810 and the password confirmation area 812 and the add button 814 is operated, the tier storage file system management table 74 is updated according to the information about the added file system.

If Lowest Tier is selected by the pull-down menu button 714 when the tier addition screen 700 in FIG. 14 is displayed, the last row is added to the tier number change management table 78 in FIG. 10. For example, if the registered generation is 0, the 0 generation is recognized as the last registered generation and 1 is added as a registered generation to the registered generation field 500. A new tier-when-registered, Tier4, is added to the tier-when-registered field 504 by adding +1 to the largest value of the tier-when-registered in the registered generation 0, from among the registered tiers in the registered generation 1. A unique ID of the file system as the ID corresponding to Tier4 is added to an entry in the ID field 506.

On the other hand, if the location other than Lowest Tier is selected by the pull-down menu button 714 when the tier addition screen 700 is displayed, a +1 row (entry) is added to the last registered generation in the tier number change management table 78; and the content of the row of the former last registered generation is copied to the relevant row with regard to the tiers to which the new file system is added, and the row of the added file system is added. A tier whose tier number is assigned by adding +1 to the value of the tier-when-registered in the preceding row is added as the tier-when-registered to the added row, and a unique ID of the added file system is added as the ID. Regarding each of the remaining rows, the tier-when-registered is changed to a value obtained by adding +1 to the value of the tier-when-registered in each row in the former last generation and the content of the ID is copied to the relevant row without any change.

If the location between Tier2 and Tier3 is selected by the pull-down menu button 714 and the first server 18 is selected as another server by the pull-down menu button 712 when the tier addition screen 700 is displayed, the tier addition processing for inserting the fourth file system FS4 between Tier2 and Tier3 is executed.

Figures 16, 17:
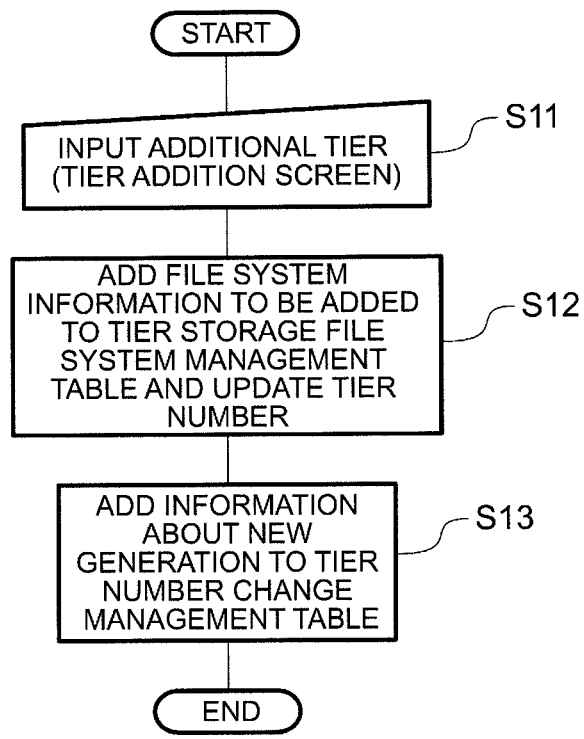
FIG. 16 is a flowchart explaining tier addition processing executed by an operation management program.
FIG. 17 is a configuration diagram of the tier storage file system management table after adding Tier3.

In this case, the file server 16 executes the tier addition processing by the operation management program as shown in FIG. 16. The file server 16 firstly executes processing for displaying the tier addition screen 700 as additional tier input processing, adds information about the additional file system to the tier storage file system management table 74 and updates the tier number (S12), adds information about a new generation to the tier number change management table 78 (S13), and then terminates the processing in this routine.

Specifically speaking, the CPU 34 for the file server 16 executes processing for changing the former Tier3 to a new Tier4 and inserting the fourth file system FS4 into the new Tier3 and executes processing for copying the policy number used for the former Tier3 to the policy number for the new Tier4.

In this case, the CPU 34 refers to the tier number change management table 78 based on the registered generation 0 and the migration source tier in the migration policy management table 76, obtains the IDs FS1, FS3, FS5 belonging to the registered generation 0 from the tier number change management table 78, searches the tier storage file system management table 74 by using the obtained IDs, and finds Tier4 as a new tier.

If the above-described processing is executed and the new Tier3 constituting the fourth file system FS4 is added between Tier2 and Tier3, the tier storage file system management table 74 is updated as shown in FIG. 17 and the tier number change management table 78 is updated as shown in FIG. 18.

Regarding the tier storage file system management table 74 shown in FIG. 17, an entry 326 is added and the entry 326 stores information about the new Tier3. The entry 324 stores information indicating that the former Tier3 has been updated to a new Tier4.

Regarding the tier number change management table 78 shown in FIG. 18, an entry 522 is added to the registered generation field 500 and the entry 522 stores information about the registered generation 1. The tier-when-registered field 502 for this entry 522 with the registered generation 1 stores 1 to 4 corresponding to four Tier1 to Tier4 and FS1, FS3, FS4, FS5 are added as the IDs corresponding to Tier1 to Tier4, respectively, to the ID field 506. In this case, regarding the registered generation 1, Tier3 is constituted from the added fourth file system FS4 and Tier4 is constituted from the fifth file system FS5 which has been changed from the former Tier3.

On the other hand, the migration policy management table 76 is not changed by the addition of the new Tier3 as shown in FIG. 19 and keeps the same content as that of the migration policy management table 76 shown in FIG. 9.

On the other hand, regarding a migration policy list table 76A (a list table created by the CPU 34 based on the migration policy management table 76 so that a user who uses each client 10 can recognize the added content), the numbers in the migration destination tier field 404 for the entries 422 and 424 are updated to 3 and 4, respectively, as shown in FIG. 20 in accordance with the change of the former Tier3 to the new Tier4.

The configuration of the migration policy list table 76A is the same as that of the migration policy management table 76, except that the registered generation field 406 does not exist in the migration policy list table 76A; and the content of the migration policy list table 76A is transferred to each client 10 and displayed on a display screen for each client 10.

If the CPU 34 creates the migration policy list table 76A for managing a plurality of pieces of policy information as information including at least the tier level of the migration destination storage tier of each file system and a storage tier constituted from a new file system is added as the new Tier3 to the plurality of storage tiers in the above-described case, on condition that the migration policy management table 76 is updated, the tier level of the migration destination storage tier of each file system in the migration policy list table 76A is updated in accordance with the content of the updated tier number change management table 78 and the content of the updated migration policy list table 76A is sent to each client 10 which is the access requester.

The policy (policy information) herein indicated specifies, for example, the condition for each policy number. If a policy description such as a script language is provided as the policy, it is sometimes difficult to automatically switch the policy number and the registered generation when a tier is added. Therefore, in this embodiment, the generation at the time of registration of a policy can be managed by each policy number and the current tier can be defined based on a definition for setting the relationship between the registered generation and the tier.

Incidentally, the user can set a policy for the new Tier3 as the need arises. When doing so, it is also possible to store the information about the policy numbers 1000, 1003, 1004 without any change, reset the information about the policy number 1002 as migration from Tier2 to Tier3, adds a new policy number 1005, and set a new condition for the policy number 1005. The policy management will be explained below.

Next, FIG. 21 shows a display example of a policy list screen 900. The policy list screen 900 includes an operational object display area 902, a policy list display area 904, a new button 906, a change button 908, a delete button 910, and a cancel button 912.

The operational object display area 902 displays, for example, the name of a device which is an operational object. The policy list display area 904 displays information about a policy number 914, a migration source tier 916, a migration destination tier 918, an activation schedule 920, and a condition 922.

The content of the policy list can be changed or deleted on a policy basis by selecting any of the entries (rows) in the policy list display area 904 and operating the change button 908 or the delete button 910.

If the change button 900 or the new button 906 is selected, the same screen will be displayed. However, if the change button 908 is selected after designating any of the policy numbers, the content of the entry of the designated policy number will be edited. Furthermore, if the new button 906 is selected after designating any of the policy numbers and the information about the designated policy number exists, the content of the relevant entry can be edited by copying only the content of the policy based on the designated policy number. Incidentally, FIG. 21 shows the state where the content of the migration policy management table 76 is displayed without any change.

Next, FIG. 22 shows a display example of a policy edit screen 1000. The policy edit screen 1000 includes an operational object display area 1002, a policy number display area 1004, a migration source tier select area 1006, a migration destination tier select area 1008, an activation schedule select area 1010, a condition select area 1012, an OK button 1014, a cancel button 1016, and an AND/OR button 1018.

The operational object display area 1002 displays, for example, a tier storage file system volume which is an operational object. The policy number display area 1004 displays a new number as the policy number in a case of a new policy, or the policy number of an object to be changed in a case of a change.

The migration source tier select area 1006 displays the tier number as a result of the operation of a pull-down menu and the migration destination tier display area 1008 displays the tier number as a result of the operation of a pull-down menu. The activation schedule select area 1010 displays the day of the week, date, and time for setting the activation schedule as a result of the operation of each pull-down menu. The condition display area 1012 displays information such as 30 Days Have Elapsed Since Last Access.

If the OK button 1014 is operated after edit operation using the policy edit screen 1000, the information in the migration policy management table 76 is updated. Regarding the policy number, a new entry is added to the policy number field 400 in a case of a new number or the policy number of the relevant entry is overwritten in a case of the existing policy number. The migration source tier is updated with a value of the migration source tier select area 1006. The migration destination tier is updated with a value of the migration destination tier select area 1008. The registered generation is updated with a value of the last registered generation in the tier number change management table 78. The activation schedule is updated with a value displayed in the activation schedule select area 1010. The condition is updated with a condition value displayed in the condition select area 1012. If there are a plurality of conditions as the content of the condition area and these conditions are set as AND conditions or OR conditions in the above-described circumstances, the content of the condition area is updated according to these conditions.

After termination of the policy edit processing, the migration policy management table 76 is updated as shown in FIG. 23 and the migration policy list table 76A is updated as shown in FIG. 24.

Regarding the policy numbers 1001 to 1004 in the migration policy management table 76 in FIG. 23, only the registered generation information is updated, the registered generation corresponding to the policy number 1002 is updated from 0 to 1 and the entry 428 is added. Regarding the entry 428, the policy number 1005 is added and information about the policy number 1005 is added. If the condition stating that 1 Year Has Elapsed Since Last Access is set to the entry 428 with regard to a file belonging to the new Tier3 as the registered generation 1 in the above-described case, this means that the policy to migrate the relevant file from the new Tier3 to the new Tier4 is set.

Even if the new Tier3 is added to the migration policy management table 76 in the above-described case, the registered generation of the policy number 1002 which is an object to be updated is updated from 0 to 1 without changing the relationship between the policy numbers 1002, 1003 regarding the former Tier3 and Tier3, and the policy number 1005 is added for the new Tier3 and a policy corresponding to the policy number 1005 is set.

The migration policy list table 76A shown in FIG. 24 is updated based on the content of the policy edit processing, the tier number for the policy number 1002 is reset, the entry 428 is added, the policy number 1005 is added to the entry 428, and information corresponding to the policy number 1005 is added.

Specifically speaking, the migration policy list table 76A shown in FIG. 24 reflects the updated content of the information in the migration policy list table 76A shown in FIG. 20 in order to display the latest information. For example, immediately after adding the new Tier3, the migration source tier for the policy number 1002 is updated from 3 to 4 in FIG. 20.

However, since the policy to migrate the relevant file from the new Tier3 to the new Tier4 is set to the policy number 1005 after the policy edit processing in FIG. 24, it is unnecessary to retain the policy for the policy number 1002 to migrate the relevant file from Tier2 to Tier4, so that the policy is changed back to the policy to migrate the relevant file from Tier2 to Tier3.

In this case, on condition that the migration policy management table 76 is updated, the CPU 34 adds the new policy information (information corresponding to the policy number 1005) to the migration policy list table 76A; updates again the tier level of the migration destination tier, in the migration policy list table 76A, regarding which the registered generation in the updated migration policy management table 76 belongs to the same policy information (information corresponding to the policy number 1002) as the policy information updated to the new registered generation 1, according to the content of the updated migration policy management table 76; and sends the content of the migration policy list table 76A updated again to each client 10 which is the access requester.

If a demand to add a tier constituted from the second file system FS2 between Tier1 and Tier2 then arises, the CPU 34 for the file server 16 executes processing for adding a new tier.

Specifically speaking, if a file system constituted from the second file system FS2 is added as a new Tier2, the new Tier2 is added as Tier2 in the generation 2; Tier 2 in the generation 1 is updated to a new Tier3 in the generation 2; Tier 3 in the generation 1 is updated to a new Tier4 in the generation 2; and Tier4 in the generation 1 is updated to a new Tier5 in the generation 2. Incidentally, Tier1 in the generation 1 is updated to, and remains to be, Tier1 in the generation 2.

In this case, the above-described information is stored in the tier storage file system management table 74 with respect to the policy numbers 1002, 1003, 1004, 1005 and processing for resetting the policy to migrate the relevant file from Tier2 to Tier3 is executed for the policy number 1001. Furthermore, a new policy number 1006 is added to the tier storage file system management table 74 and information that sets, for example, a policy corresponding to the new policy number 1006 to migrate the relevant file from Tier1 to Tier2 is added to the tier storage file system management table 74.

FIG. 25 shows the content of the tier storage file system management table 74 immediately after adding a new Tier2 as the content of each management table when the new Tier2 is added between Tier1 and Tier2; FIG. 26 shows the content of the tier number change management table 78 immediately after adding the new Tier2; FIG. 27 shows the content of the migration policy management table 76 immediately after adding the new Tier2; and FIG. 28 shows the content of the migration policy list table 76A immediately after adding the new Tier2.

Regarding to the tier storage file system management table 74 in FIG. 25, an entry 328 is added and information about Tier2 is added to the entry 328. The entry 322 is updated with Tier3 information, the entry 324 is updated according to Tier5 information, and the entry 326 is updated according to Tier4 information.

Regarding the tier number change management table 78 in FIG. 26, information about an entry 524 is added and information about the registered generation 2 is added to the entry 524. In this case, the tier-when-registered field 504 sequentially stores tier levels 1 to 5 corresponding to Tier1 to Tier5. Furthermore, the ID field 506 stores FS1 as the ID corresponding to Tier1, FS2 as the ID corresponding to Tier2, FS3 as the ID corresponding to Tier3, FS4 as the ID corresponding to Tier4, and FS5 as the ID corresponding to Tier5.

In this case, the tier number change management table 78 shows that Tier2 is added as the second file system FS2. Also, it shows that Tier3 to Tier5 are updated from the former Tier2 to Tier4 to new Tier3 to Tier5, respectively. It shows that the new Tier3 is constituted from the third file system FS3, the new Tier4 is constituted from the fourth file system FS4, and the new Tier5 is constituted from the fifth file system FS5.

The content of the migration policy management table 76 shown in FIG. 27 is not changed immediately after adding Tier2 as compared to the content before adding Tier2.

On the other hand, information about the migration source tier and the migration destination tier in the migration policy list table 76A shown in FIG. 28 is partially updated immediately after adding Tier2.

For example, the tier level of the migration destination tier for the policy number 1001 is updated from 2 to 3; and for the policy number 1002, the tier level of the migration source tier is updated from 2 to 3 and the tier level of the migration destination tier is updated from 3 to 4. Also, the tier level of the migration destination tier for the policy number 1003 is updated from 4 to 5. Furthermore, for the policy number 1005, the tier level of the migration source tier is updated from 3 to 4 and the tier level of the migration destination tier is updated from 4 to 5.

Next, FIG. 29 shows the content of the migration policy management table 76 and FIG. 30 shows the content of the migration policy list table 76A in the state after adding the new Tier2 and a policy number 1006.

Referring to FIG. 29, the entry 420 information in the migration policy management table 76 is partially updated and information about the policy number 1006 is added to an entry 430.

In this case, for the policy number 1001, the tier level of the migration source tier is updated from 1 to 2, the tier level of the migration destination tier is updated from 2 to 3, and the registered generation is updated from 0 to 2.

Furthermore, information about the registered generation 2 as a policy to migrate the relevant file from Tier1 to Tier2 is added to the policy number 1006.

If the same value of the tier level of the tier migration destination as that of new policy information (information according to the policy number 1006), that is, 2 indicating Tier2 exists as, for example, the tier level 2 of the migration destination tier for the policy number 1001 in the policy information different from the new policy information in the migration policy management table 76 when updating the migration policy management table 76 in the above-described case, the CPU 34 resets the tier levels of the migration source tier and the migration destination tier to 2 and 3, respectively, from among the policy information corresponding to the policy number 1001.

Regarding the migration policy list table 76A in FIG. 30, the entry 420 information is partially updated and the entry 430 is added as information about the policy number 1006.

In this case, along with the processing for resetting the policy for the policy number 1001 to migrate the relevant file from Tier2 to Tier3, the tier level of the migration source tier is updated from 1 to 2. Regarding the policy number 1006, information about a policy to migrate the relevant file, regarding which 1 Day Has Elapsed Since Last Access, from Tier1 to Tier2 is added.

This embodiment has described the case where a new storage tier is added. However, this invention can be applied to a case where part of the existing storage tiers is deleted. In this case, every time part of the existing storage tiers is deleted, such storage tier deletion can be processed in the same manner as the processing for adding a new storage tier by adding an entry to each management table and adding a registered generation to the added entry.

According to this embodiment, a new storage tier can be added to a plurality of storage tiers (Tiers) configured in storage areas of a plurality of types of disks (storage devices) 44 to 52 whose processing performance is different from each other, without changing the operation form.

Moreover, since the tier level of each storage tier is described in natural numbers (positive integers) according to this embodiment, policy information of each file system can be described with relative policies even when a tier is migrated to a higher level or a lower level.

Furthermore, even when a new tier is inserted between any storage tiers from among the plurality of storage tiers, it is possible to maintain the policy information of each file system as absolute policies according to this embodiment.

REFERENCE SIGNS LIST

10 Client
12 Network
14 Management terminal
16 File server
18 First server
20 Second server
24, 26, 28 Storage apparatuses
34 CPU
36 Memory
60 File service program
62 Tier storage file system program
64 Standard file system program
66 Inter-tier file migration program
68 Operation management program
70 Export table
72 Mount table
74 Tier storage file system management table
76 Migration policy management table
78 Tier number change management table
80 Virtual file system
82 Stub information

The invention claimed is:

1. A storage subsystem comprising:
    a storage apparatus having a plurality of types of storage devices whose processing performance is different from each other; and
    a controller configured to manage, as an access object for an access requester, a tier storage file system configured by integrating a plurality of file systems including a file group configured in a storage area of the storage apparatus and virtually hierarchize the integrated plurality of file systems into a plurality of storage tiers; and change a storage tier to which each file system belongs, based on a plurality of pieces of policy information that set a migration condition for each file system,
    wherein the controller: manages the relationship between each file system and a tier level of a storage tier, to which each file system belongs, using a tier number change management table by associating the storage tier with a registered generation based on the time of registration; and manages the plurality of pieces of policy information, the plurality of pieces of policy information including at least the relationship between a tier level of a migration destination storage tier of each file system and the registered generation, using a migration policy management table, and
    wherein if a storage tier constituted from a new file system is to be added as a new storage tier to the plurality of storage tiers, the controller: adds a new registered generation to the tier number change management table and adds an entry corresponding to the new registered generation to the tier number change management table, the entry including the plurality of storage tiers and each file system corresponding to the registered generation preceding the new registered generation; changes a tier level of a storage tier affected by the addition of the new storage tier and updates the tier number change management table by adding the new storage tier as an entry corresponding to the storage tier the new registered generation in the tier number change management table; adds new policy information, in which a condition for migrating the new file system is set, to the migration policy management table and updates a registered generation of a storage tier which is a migration destination of the new file system, the storage tier which is the migration destination of the new file system being the new storage tier, from among registered generations in the migration policy management table, to the new registered generation; and updates the migration policy management table by adding the new registered generation as a registered generation of the new policy information.

2. The storage subsystem according to claim 1, wherein when receiving an access request from the access requester, the controller: refers to stub information which is set to the tier storage file system as information indicating a storage location of each file; extracts a file system of a storage tier, in which a file designated by the access request exists, from among the plurality of file systems based on the stub information; extracts the file designated by the access request from a file group to which the extracted file system belongs; and executes data input-output processing on the extracted file.

3. The storage subsystem according to claim 1, wherein the controller manages the plurality of pieces of policy information, the plurality of pieces of policy information including at least the tier level of the migration destination storage tier of each file system, by using a migration policy list management table; and
    wherein if the storage tier constituted from the new file system is to be added as the new storage tier to the plurality of storage tiers, on condition that the migration policy management table is updated, the controller: updates the tier level of the storage tier, which is the migration destination of each file system, in the migration policy list management table according to the content of the updated tier number change management table; and sends the content of the updated migration policy list management table to the access requester.

4. The storage subsystem according to claim 3, wherein if the storage tier constituted from the new file system is added as the new storage tier to the plurality of storage tiers, on condition that the migration policy management table is updated, the controller: adds the new policy information to the migration policy list management table; updates again the tier level of the migration destination storage tier of each file system in the migration policy list management table, regarding which the registered generation in the updated migration policy management table belongs to the same policy information as policy information updated to the new registered generation, according to the content of the updated migration policy management table; and sends the content of the migration policy list management table updated again to the access requester.

5. The storage subsystem according to claim 1, wherein if the migration policy management table is to be updated and if the same tier level as that of the new policy information exists as the tier level of the storage tier, which is the migration destination of each file system, for policy information different from the new policy information in the migration policy management table, the controller resets the tier level of the storage tier corresponding to the policy information and updates the migration policy management table.

6. The storage subsystem according to claim 5, wherein the controller manages the plurality of pieces of policy information, the the plurality of pieces of policy information including at least the tier level of the migration destination storage tier of each file system, using a migration policy list management table; and wherein if the storage tier constituted from the new file system is added as the new storage tier to the plurality of storage tiers, on condition that the migration policy management table is updated, the controller updates the tier level of the migration destination storage tier of each file system in the migration policy list management table according to the content of the updated tier number change management table and sends the content of the updated migration policy list management table to the access requester.

7. A method for controlling a subsystem, the subsystem comprising a storage apparatus having a plurality of types of storage devices whose processing performance is different from each other; and a controller, the method comprising:

managing, by the controller, as an access object for an access requester, a tier storage file system configured by integrating a plurality of file systems including a file group configured in a storage area of the storage apparatus and virtually hierarchizing the integrated plurality of file systems into a plurality of storage tiers;

changing, by the controller, a storage tier to which each file system belongs, based on a plurality of pieces of policy information that set a migration condition for each file system;

managing, by the controller, the relationship between each file system and a tier level of a storage tier, to which each file system belongs, using a tier number change management table by associating the storage tier with a registered generation based on the time of registration; and manages the plurality of pieces of policy information, the plurality of pieces of policy information including at least the relationship between a tier level of a migration destination storage tier of each file system and the registered generation, using a migration policy management table, wherein if a storage tier constituted from a new file system is to be added as a new storage tier to the plurality of storage tiers, the method further comprises:

adding, by the controller, a new registered generation to the tier number change management table and adding an entry corresponding to the new registered generation to the tier number change management table, the entry including the plurality of storage tiers and each file system corresponding to the registered generation preceding the new registered generation;

changing, by the controller, a tier level of a storage tier affected by the addition of the new storage tier and updates the tier number change management table by adding the new storage tier as an entry corresponding to the new registered generation in the tier number change management table;

adding, by the controller, new policy information, in which a condition for migrating the new file system is set, to the migration policy management table and updates a registered generation of a storage tier which is a migration destination of the new file system, the storage tier which is the migration destination of the new file system being the new storage tier, from among registered generations in the migration policy management table, to the new registered generation; and updating, by the controller, the migration policy management table by adding the new registered generation as a registered generation of the new policy information.

8. The storage subsystem control method according to claim 7, wherein when receiving an access request from the access requester, the method further comprises:

referring, by the controller, to stub information which is set to the tier storage file system as information indicating a location of each file;

extracting, by the controller, a file system of a storage tier, in which a file designated by the access request exists, from among the plurality of file systems based on the stub information;

extracting, by the controller, the file designated by the access request from a file group to which the extracted file system belongs; and executing, by the controller, data input-output processing on the extracted file.

9. The storage subsystem control method according to claim 7, further comprising:

managing, by the controller, the plurality of pieces of policy information, the plurality of pieces of policy information including at least the tier level of the migration destination storage tier of each file system, by using a migration policy list management table; and if the storage tier constituted from the new file system is to be added as the new storage tier to the plurality of storage tiers, on condition that the migration policy management table is updated, updating, by the controller, the tier level of the storage tier, which is the migration destination of each file system, in the migration policy list management table according to the content of the updated tier number change management table, and sending, by the controller, the content of the updated migration policy list management table to the access requester.

10. The storage subsystem control method according to claim 9, wherein if the storage tier constituted from the new file system is added as the new storage tier to the plurality of storage tiers, on condition that the migration policy management table is updated, the method further comprises:

adding, by the controller, the new policy information to the migration policy list management table, and updating again the tier level of the migration destination storage tier of each file system in the migration policy list management table, regarding which the registered generation in the updated migration policy management table belongs to the same policy information as policy information updated to the new registered generation, according to the content of the updated migration policy management table; and sending, by the controller the content of the migration policy list management table updated again to the access requester.

11. The storage subsystem control method according to claim 7, wherein if the migration policy management table is to be updated and if the same tier level as that of the new policy information exists as the tier level of the storage tier, which is the migration destination of each file system, for policy information different from the new policy information in the migration policy management table, the method further comprises:

resetting, by the controller, the tier level of the storage tier corresponding to the policy information and updates the migration policy management table.

12. The storage subsystem control method according to claim 11, further comprising:

managing, by the controller, the plurality of pieces of policy information, the plurality of pieces of policy information including at least the tier level of the migration destination storage tier of each file system, using a migration policy list management table; and if the storage tier constituted from the new file system is added as the new storage tier to the plurality of storage tiers, on condition that the migration policy management table is updated, updating, by the controller, the tier level of the migration destination storage tier of each file system in the migration policy list management table according to the content of the updated tier number change management table, and sending, by the controller, the content of the updated migration policy list management table to the access requester.

* * * * *